(12) United States Patent
Keysar et al.

(10) Patent No.: US 10,447,049 B2
(45) Date of Patent: Oct. 15, 2019

(54) SELF-POWERED ELECTRONIC SHELF LABEL AND POWER MANAGER THEREOF

(71) Applicant: Sol Chip Ltd., Haifa (IL)

(72) Inventors: Shani Keysar, Haifa (IL); Rami Friedlander, Zichron Yaakov (IL); Ron Liraz, Haifa (IL); Doron Pardess, Nahariya (IL)

(73) Assignee: Sol Chip Ltd., Haifa (IL)

( * ) Notice: Subject to any disclaimer, the term of this patent is extended or adjusted under 35 U.S.C. 154(b) by 353 days.

(21) Appl. No.: 15/495,097

(22) Filed: Apr. 24, 2017

(65) Prior Publication Data

US 2017/0317511 A1  Nov. 2, 2017

Related U.S. Application Data

(60) Provisional application No. 62/328,897, filed on Apr. 28, 2016.

(51) Int. Cl.

| | |
|---|---|
| *H02J 7/00* | (2006.01) |
| *H02J 7/34* | (2006.01) |
| *H02J 7/35* | (2006.01) |
| *H02H 3/20* | (2006.01) |
| *G06F 3/147* | (2006.01) |
| *G09G 3/20* | (2006.01) |

(52) U.S. Cl.
CPC ............ *H02J 7/0031* (2013.01); *G06F 3/147* (2013.01); *H02H 3/207* (2013.01); *H02J 7/0029* (2013.01); *H02J 7/345* (2013.01); *H02J 7/35* (2013.01); *H02J 7/355* (2013.01); *G09G 3/2092* (2013.01); *G09G 2330/021* (2013.01); *G09G 2330/04* (2013.01); *G09G 2330/08* (2013.01); *G09G 2380/04* (2013.01); *H02J 2007/004* (2013.01); *H02J 2007/0037* (2013.01); *Y02E 10/566* (2013.01); *Y02E 10/58* (2013.01)

(58) Field of Classification Search
CPC .......... H02J 7/0031; H02J 7/35; H02J 7/0029; H02J 7/355; H02J 7/345; H02J 2007/004; H02J 2007/0037; G06F 3/147; H02H 3/207; Y02E 10/58; G09G 2380/04; G09G 2330/04; G09G 2230/021; G09G 3/2092; G09G 2330/08
See application file for complete search history.

(56) References Cited

U.S. PATENT DOCUMENTS

| | | | |
|---|---|---|---|
| 6,108,367 | A | 8/2000 | Herman et al. |
| 7,152,040 | B1 | 12/2006 | Hawthorne et al. |
| 8,261,971 | B2 | 9/2012 | Hung et al. |
| 2013/0036636 | A1 | 2/2013 | Karhuketo et al. |

*Primary Examiner* — Aneeta Yodichkas
(74) *Attorney, Agent, or Firm* — M&B IP Analysts, LLC

(57) ABSTRACT

A self-powered electronic shelf label (ESL), comprising: a processing circuitry; a display communicatively coupled to the processing circuitry; a communication circuit communicatively coupled to the processing circuitry, wherein the communication circuit is configured to receive and transmit data from a control device; and a power manager connected to the processing circuitry, the display, an energy storage, and a plurality of photovoltaic (PV) cells, the power manager including a maximum power point tracker (MPPT) circuit, wherein the MPPT circuit is configured to continuously determine a maximum power point of the PV cells, wherein the power manager is configured to connect, based on the determined maximum power point, at least a portion of the plurality of PV cells to a load such that the plurality of PV cells produce a voltage equal to the continuously determined maximum power point.

20 Claims, 4 Drawing Sheets

SELF-POWERED ELECTRONIC SHELF LABEL AND POWER MANAGER THEREOF

CROSS-REFERENCE TO RELATED APPLICATIONS

This application claims priority from U.S. Provisional Patent Application No. 62/328,897 filed on Apr. 28, 2016 which is hereby incorporated by reference for all that it contains.

TECHNICAL FIELD

The disclosure generally relates to electronic shelf labels (ESLs) and particularly to power management of ESLs.

BACKGROUND

Electronic shelf labels (ESLs) are seeing widespread use, as they can potentially save retailers resources by being updatable from a central location over a network, rather than manually as previous solutions required. They can also enable new features like on line advertising and frequent price changes based on time, day, shop activities, discount periods, and more.

FIG. 1 is a block diagram of a conventional ESL 100. The ESL 100 includes a controller 110 coupled to a receiver 120, a memory 130, and a display 140. The receiver 120 is connected to an antenna (not shown) to receive data. The information displayed on the display 140 can be updated dynamically during use of the ESL 100, for example, in response to receipt of data from a server (not shown). The displayed information may be in a format of text data, graphics, or both. The displayed information may include a SKU, product description, current price, promotion, and the like.

The ESL 100 also includes a power supply 150 to power the various electronic circuitries in the ESL. In a typical implementation, the power supply 150 is a battery or a capacitor. The battery or capacitor may be rechargeable using a solar power source 155 coupled to the power supply 150.

Typically, ESLs are low power devices and their power supplies or sources impose some limitations on their usage. For example, when an ESL is powered by a battery, the battery must be frequently replaced upon depletion. However, discarding such batteries is not always simple, as batteries have to be disposed of properly, and in many cases in accordance with regulations. Taxes and penalties are regularly associated with the disposal of hazardous materials such as batteries.

Using rechargeable power supplies does not properly solve the limitations of frequent replacement of ESL. Currently available rechargeable ESLs suffer from low number of charge/discharge cycles. That is, after a few numbers of charge/discharge cycles of the power supply, such a power supply becomes depleted. Further, in current implementations, the charging time of a power supply is relatively long, which causes ESL to malfunction during the charging time.

In addition, rechargeable ESLs are not designed to include circuitries to regulate the current for charging the power supply. ESLs are typically installed indoors (e.g., in supermarkets). The output of the solar power source can vary considerably with changes in environmental conditions, such as radiance from light sources and temperature of the operating environment. Given the dynamic changes, an output current of the solar power source can fluctuate and, thus, the solar power source does not provide the optimal efficiency for charging the power supply. Moreover, an overcharge current may harm the power supply.

It is therefore desirable to provide an ESL with an improved life cycle over prior art solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a self-powered electronic shelf label (ESL), comprising: a processing circuitry; a display communicatively coupled to the processing circuitry; a communication circuit communicatively coupled to the processing circuitry, wherein the communication circuit is configured to receive and transmit data from a control device; and a power manager connected to the processing circuitry, the display, an energy storage, and a plurality of photovoltaic (PV) cells, the power manager including a maximum power point tracker (MPPT) circuit, wherein the MPPT circuit is configured to continuously determine a maximum power point of the PV cells, wherein the power manager is configured to connect, based on the determined maximum power point, at least a portion of the plurality of PV cells to a load such that the plurality of PV cells produce a voltage equal to the continuously determined maximum power point.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
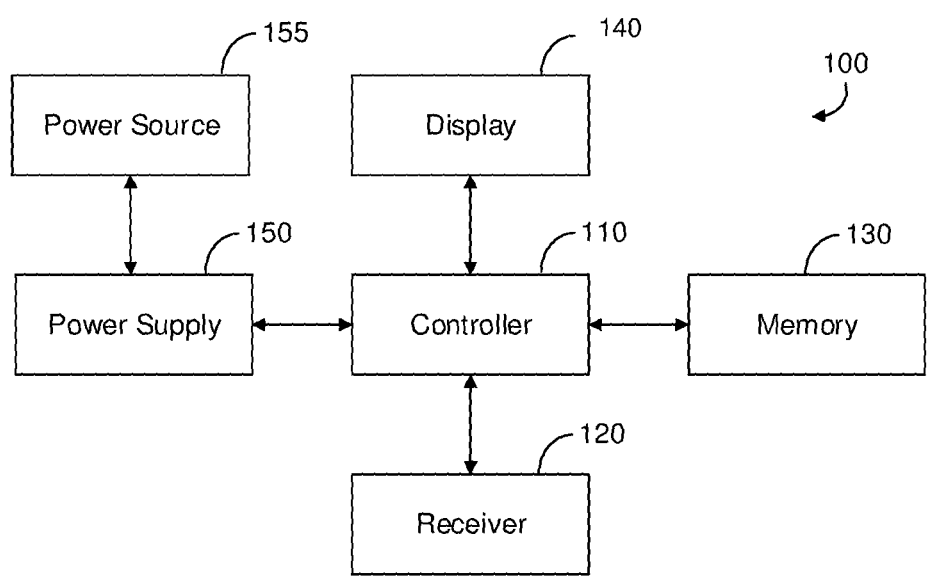
FIG. 1 is a block diagram of an existing electronic shelf label (ESL) (prior art).

The embodiments disclosed herein are only examples of the many possible advantageous implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like elements throughout.

By way of example, a solar powered electronic shelf label (ESL) with a power manager circuitry is provided. In an embodiment, the power manager controls a plurality of photovoltaic cells (PV cells). The PV cells supply charge to an energy storage and further supply current to a load of the ESL. The load may include a processing circuitry, a low power display (e.g., an e-ink display), a communication circuit, a memory, and a circuitry of the power manager. In an embodiment, the power manager may include a maximum power point (MPP) tracker, an over charge protection circuit, and an over discharge protection circuit.

Figure 2:
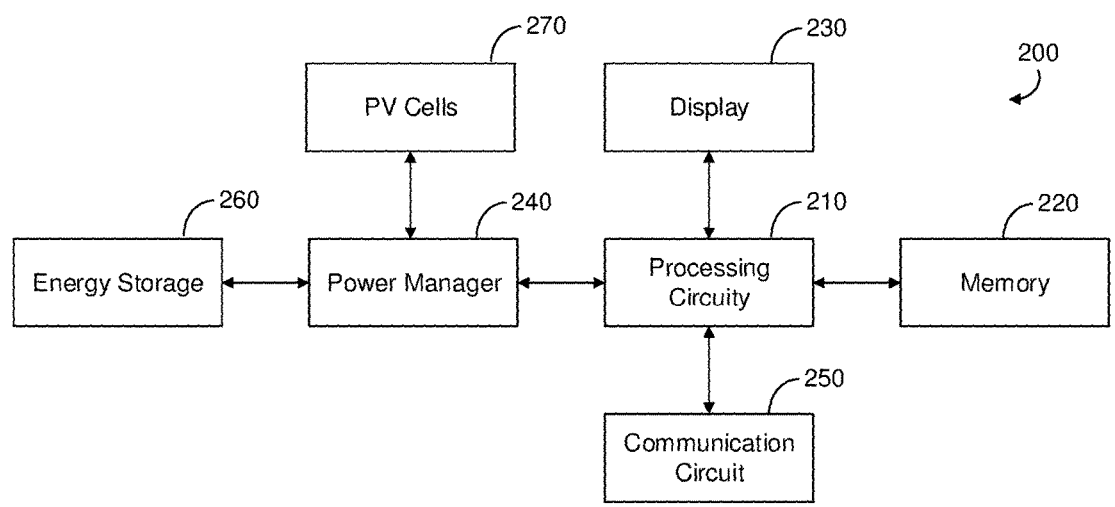
FIG. 2 is an illustration of a self-powered ESL implemented according to an embodiment.

FIG. 2 is an example illustration of a self-powered electronic shelf label (ESL) 200, implemented according to an embodiment. The ESL 200 includes at least one processing circuitry 210. In an embodiment, the processing circuitry 210 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 210 is coupled to a memory 220. The memory 220 may be implemented as an internal memory of the processing circuitry 210. The memory 220 may include a memory portion that contains instructions that when executed by the processing circuitry 210 performs the method described in more detail herein. The memory 220 may be further used as a working scratch pad for the processing circuitry 210, a temporary storage, and others, as the case may be.

The memory 220 may be a volatile memory such as, but not limited to, a random access memory (RAM), or a non-volatile memory (NVM), such as, but not limited to, a Flash memory. The processing circuitry 210, the memory 220, or both, may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The processing circuitry 210 is further coupled with a display 230 and with a communication circuit 250. The display 230 may be a low-power, or ultra-low power display such as, for example, an e-ink display. In some embodiments, a liquid crystal display (LCD) with low power consumption may be used.

The communication circuit 250 is configured to provide communication of various sorts, for example to a wireless network. The wireless network may be a local wireless network (e.g., a Wi-Fi network), a cellular network, Bluetooth, near-field communication (NFC), Infra-red network, combinations thereof, and the like. The communication circuit 250 may include support for a plurality of communication protocols. The communication circuit 250 is operative for receiving instructions which may cause the processing circuitry 210 to configure the ESL 200 to perform the methods described in more detail herein. The received instructions may be stored on the memory 220. The communication circuit 250 may also be operative for transmitting information from the ESL 200.

According to the disclosed embodiments, the ESL 200 includes a power manager 240 and a plurality of photovoltaic (PV) cells 270. The power manager 240 is coupled to the PV cells 270 and to an energy storage 260. The power manager 240 is operative for supplying charge from the PV cells 270 to the energy storage 260, for supplying current to the load, and for disconnecting, temporarily or permanently, any PV cell of the PV cells 270.

The energy storage 260 is configured to store charge collected from the PV cells 270, and to provide the charge to a load, through the power manager 240. The load may be or may include, for example, the processing circuitry 210, the memory 220, the low power display 230, the communication circuit 250, or any combination thereof. The energy storage 260 may be, for example, a capacitor, a lithium-ion battery, a lithium polymer battery, and the like.

In an embodiment, the energy storage 260 is a super capacitor. A super capacitor, also referred to as an ultra-capacitor or an electric double layer capacitor (EDLC), is a capacitor that has a very large capacitance in a useable size that would otherwise not be reachable in standard capacitor techniques. Capacitance values reaching up to 400 Farads are available in standard case sizes. Such capacitors can therefore store large amounts of energy and hence can be used as a super capacitor. The reason for using such super capacitors will be understood as further explanation is provided herein. In another embodiment, a rechargeable battery may be used without departing from the principles of the disclosed embodiments.

In an embodiment, the power manager 240 may be implemented as a circuit of a semiconductor device, upon which a plurality of PV cells 270 are deposited over a top conducting layer of the semiconductor device, for example by methods described in more detail in U.S. Pat. No. 8,921,967, which is hereby incorporated by reference. In another embodiment, a plurality of PV cells 270 are arranged in an array structure where, in such a structure, pairs of a primary PV cell and a secondary PV cell have the same width and the combined length of the primary PV cell and the length of the secondary PV cell is a constant length.

In yet another embodiment, the processing circuitry 210, the memory 220, the communication circuit 250, the energy storage 260, the power manager 240, or any combination thereof, may be implemented as a semiconductor device having a top conductive layer, upon which the plurality of PV cells 270 are deposited. For example, in such arrangement, a plurality of PV cells 270 are formed over a passivation layer of a target integrated circuit (not shown) and at least one PV cell of the PV cells 270 is usable as a photo-sensing circuit to transform the light intensity level to current. An example for such an arrangement is discussed in greater detail in U.S. patent application Ser. No. 14/062,070, which is hereby incorporated by reference.

According to the disclosed embodiments, when at least one of the PV cells is utilized as a photo-sensing circuit, the provided current can be calculated, and a light level may be determined, for example according to a calibration table. A measurement of the voltage, current level, and light level may be transmitted from the ESL 200.

In some embodiments, the power manager 240 may be further connected to a charging port (not shown) which is operative for receiving an external power source to charge the energy storage 260, to supply current to the load, or both.

The processing circuitry 210 may further sample the voltage level of the energy storage 260 for the purpose of A/D sampling.

Figure 3:
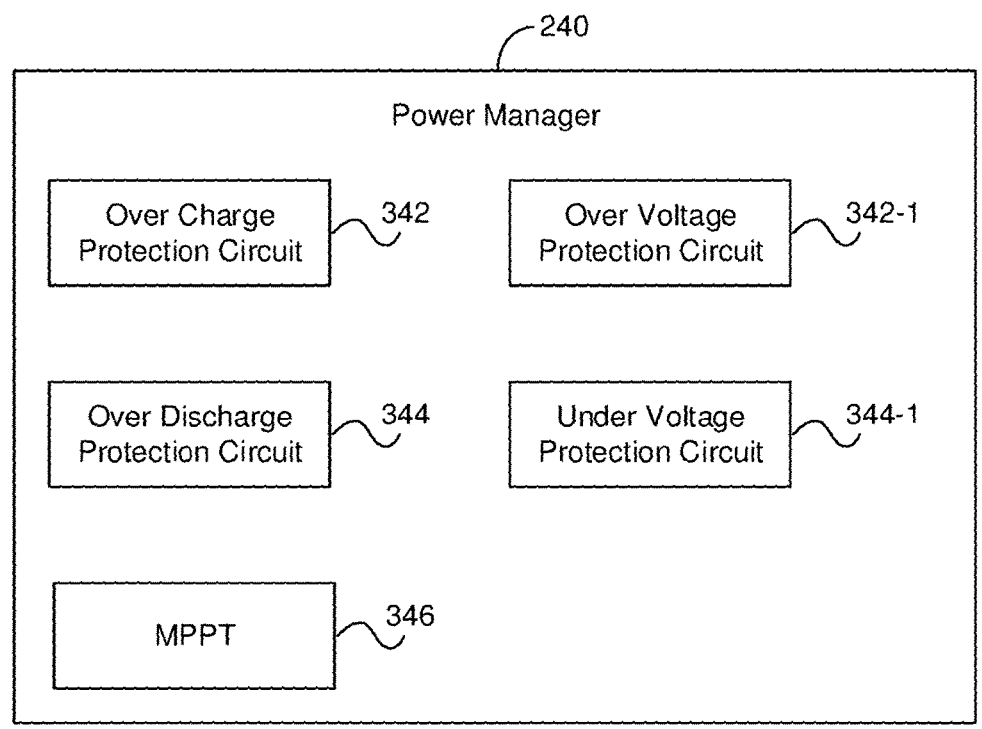
FIG. 3 is a schematic illustration of a power manager of an ESL, in accordance with an embodiment.

FIG. 3 is an example schematic illustration of the power manager 240 of an ESL 200, in accordance with an embodiment. The power manager 240 may include an over-charge protection circuit 342, an over-discharge protection circuit 344, and a maximum power point tracker (MPPT) 346.

The over-charge protection circuit 342 is configured to protect the energy storage 260. In an embodiment, the over-charge protection circuit 342 is configured to protect the energy storage 260 from charging over a pre-configured threshold value. The over-discharge protection circuit 344 is configured to protect the energy storage 260 from discharging below a predefined threshold value. Over discharging may cause irreversible damage to the energy storage 260.

In some embodiments, the power manager 240 includes an over-voltage protection circuit 342-1 to protect a load from a condition in which the load is subject to a higher voltage than the load can handle. For example, the over-voltage protection circuit 342-1 protects the load from voltage levels higher than a predefined threshold value. The over-voltage protection circuit 342-1 is configured to remove the load from the power supply, which may be connected through power manager 240 to the load.

The power manager 240 may further include an under-voltage protection circuit 344-1 to protect the load from a condition where the load is subjected to a voltage lower than the load's requirement, causing the load to attempt to draw excessive current. For example, the under-voltage protection circuit 344-1 protects the load from voltage levels lower than a predefined threshold value. The under-voltage protection circuit 344-1 is configured to remove the load from the power supply, which may be connected through the power manager 240 to the load. The load may include the processing circuitry 210, the low power display 230, the memory 220, the communication circuit 250 (shown in FIG. 2), or a combination thereof.

In certain embodiments, the power manager 240 further includes a switching circuit (not shown) to switch at least a portion of the PV cells 270 between a first state in which they supply charge to energy storage 260; a second state in which at least a portion of the PV cells 270 supplies current to any of the processing circuitry 210, the memory 220, the display 230, and the communication circuit 250; and a third state in which at least a portion of the PV cells 270 may be grounded. In some embodiments, the switching circuitry may have any combination of the above states, e.g., only the first and second state.

In certain embodiments, the over-charge protection circuit 342 and the over discharge protection circuit 344 are controlled by the processing circuitry 210. In some embodiments, the over-charge protection circuit 342 and the over-discharge protection circuit 344 are controlled by a secondary processing circuitry (not shown) of the power manager 240.

According to the disclosed embodiments, the MPPT 346 is operative for optimizing the power output of the PV cells 270 and the power manager 240. It should be noted that, since the amount of light which the PV cells 270 are exposed to varies, the load characteristic that gives the highest power transfer efficiency changes. Therefore, the efficiency of the power transfer is optimized when the load characteristic changes accordingly to the maximum power point. In an embodiment, any of the various circuits described in FIG. 3, and combinations thereof, may be controlled by the processing circuitry 210.

As noted above, in an embodiment, the energy storage 260 is implemented as a super capacitor. In such an embodiment, the ESL 200 does not include a rechargeable battery, thereby eliminating the need of disposal of rechargeable batteries, which in turn decreases operational costs. In addition, a super capacitor can be utilized to rapidly store charge, while also tolerating a higher number of charge/discharge cycles.

It should be appreciated that, in such implementations where the supercapacitor is used, the power manager 240 may be particularly useful. Specifically, in such implementations, the MPPT 346 of the power manager 240 is operative for maintaining the highest efficiency when transferring power from the PV cells 270 to the energy storage 260.

When a load is connected to the PV cells 270, the operating point of the PV cells 270 will rarely be at peak power. The impedance seen by the PV cells 270 derives the operating point of the solar panel. In order to move the operating point to the maximum power point voltage, the impedance seen by the PV cells 270 needs to vary. At a particular impedance (or duty ratio), the operating point will be at the maximum power transfer point. The output of the PV cells 270 can vary considerably with changes in environmental conditions, such as radiance from light sources (e.g., sun, light fixtures, or both) and temperature of the operating environment. Given the dynamic changes, a fixed duty ratio will not always supply the best results.

In an embodiment, the MPPT 346 samples voltages, currents, or both, produced by the PV cells 270, and adjusts the duty ratio as needed to maintain maximum efficiency. In an embodiment, when fully charged, the voltage of the energy storage 260 may be close to the maximum power point voltage of the PV cells 270. However, a fully charged state is not guaranteed, for example due to unforeseen conditions which prevent the energy storage 260 from fully charging.

When charging begins at a voltage considerably below the PV cell's 270 maximum power point voltage, the MPPT 346 may resolve this mismatch. If, for example, the energy storage 260 is fully charged and the PV cell's 270 output exceeds the load requirements, the MPPT 346 may no longer operate the PV cells 270 at the maximum power point voltage, since the excess power being produced cannot be diverted to a load. The MPPT 346 may shift the PV cells' 270 operating point away from the maximum power point until production exactly matches demand. In another embodiment, the excess power produced may be diverted to a resistive load, allowing the PV cells 270 to operate continuously at the maximum power point voltage.

Figure 4:
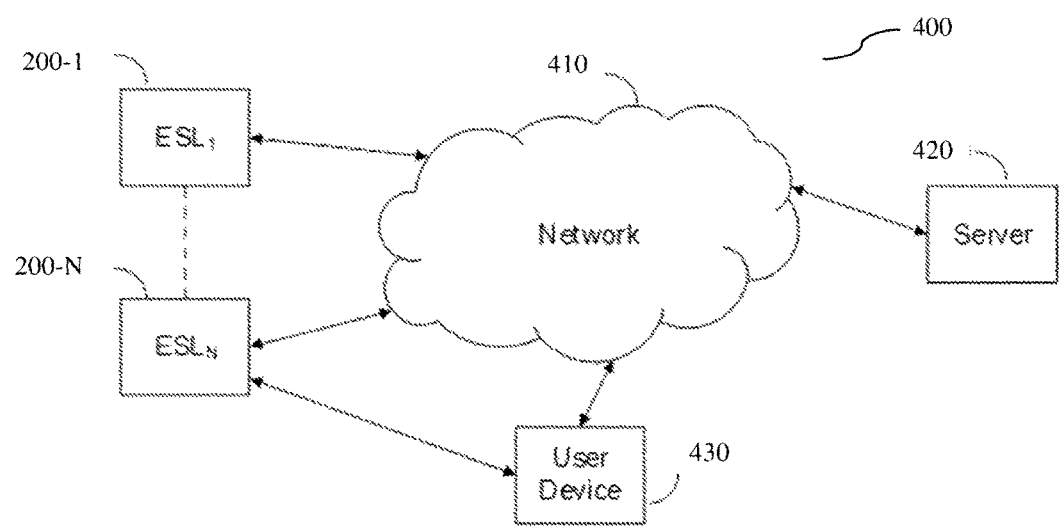
FIG. 4 is a schematic illustration of a plurality of ESLs communicatively connected to a control server, in accordance with an embodiment.

FIG. 4 is an example schematic illustration 400 of a plurality of ESLs communicatively connected to a control server 420, in accordance with an embodiment. One or more ESLs 200-1 through 200-N (hereinafter referred to individually as an ESL 200 and collectively as ESLs 200, merely for simplicity purposes) are each connected to a network 410. In this example, 'N' is an integer having a value of '1' or greater. In an embodiment, each ESL 200 is structured as the ESL demonstrated in FIG. 2.

The network 410 is configured to provide connectivity of various sorts, as may be necessary, including but not limited to, wired connectivity, wireless connectivity, or both, including, for example, local area network (LAN), wide area network (WAN), metro area network (MAN), worldwide web (WWW), Internet, and any combination thereof, as well as cellular connectivity. The ESLs 200 are configured to receive instructions over the network 410 from a control server 420. The control server 420 may be configured to send one or more of the ESLs 200 instructions which, when executed by the processing element of one of the ESLs 200, configure the ESL 200 to perform a function. The function may be, for example, to display one or more images on the display thereof, reset the display, refresh the display, restart the ESL 200, reset the ESL 200, and the like. In another example, the function may be to send to the server 420 information from the ESL 200. Information may be, for example, a measurement of the energy storage capacity, a measurement relating to the current received by the energy storage from the PV cells, a measurement of ambient light, and the like. In yet another example, the function may be to power down the display.

An ESL 200, such as the ESL 200-N, is configured to communicate with a user device 330. The user device may be, for example, a smartphone, a smartwatch, a RFID tag, a dedicated terminal, and the like. In an embodiment, upon the communication circuit 250 of the ESL 200-N sensing the user device 330, the processing circuitry 210 configures the display 230 to display media, such as a picture or video, which may be tailored to the user of the user device 330. The media may be a special offer for sale, customized advertising, and the like.

In an exemplary embodiment, the control server 420 may receive a measurement of ambient light from each of the ESLs 200. The server may determine, for each ESL 200, if the PV cells 270 of the ESL 200 are supplying optimal charge. For example, if a first ESL 200-1 has neighbor ESLs 200-2 through 200-4, and the PV cells of ESL 200-1 are producing less charge, then a notification may be sent by the control server 420 to indicate that the ESL 200-1 may benefit from repositioning or may need to uncover the ESL 200 from obstructing objects. In another example, if a first plurality of ESLs 200 are producing less charge than an expected value, and the first plurality of ESLs 200 share a spatial location, this may be an indication that the area has a lighting problem, and a notification may be sent by the control server 420 to address this issue.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

All examples and conditional language recited herein are intended to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

While the present disclosed embodiments has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosed embodiments. Furthermore, the foregoing detailed description has set forth a few of the many forms that the disclosed embodiments can take. It is intended that the foregoing detailed description be understood as an illustration of selected forms that the disclosed embodiments can take and not as a limitation to the definition of the disclosed embodiments

What is claimed is:

1. A self-powered electronic shelf label (ESL), comprising:
   a processing circuitry;
   a display communicatively coupled to the processing circuitry;
   a communication circuit communicatively coupled to the processing circuitry, wherein the communication circuit is configured to receive and transmit data from a control device; and
   a power manager connected to the processing circuitry, the display, an energy storage, and a plurality of photovoltaic (PV) cells, the power manager including a maximum power point tracker (MPPT) circuit, wherein the MPPT circuit is configured to continuously determine a maximum power point of the PV cells, wherein the power manager is configured to connect, based on the determined maximum power point, at least a portion of the plurality of PV cells to a load such that the plurality of PV cells produce a voltage equal to the continuously determined maximum power point.

2. The self-powered ESL of claim 1, wherein the power manager is further configured to supply a charge to the energy storage and to disconnect at least one of the PV cells.

3. The self-powered ESL of claim 1, wherein the power manager is further configured to supply a charge to the load and to disconnect at least one of the PV cells from the load.

4. The self-powered ESL of claim 1, wherein the load includes at least one of: the processing circuitry, the display, and the communication circuit.

5. The self-powered ESL of claim 1, wherein the power manager further includes an over-charge protection circuit configured to protect the energy storage from charging over an over-charge threshold value.

6. The self-powered ESL of claim 1, wherein the power manager further includes an over-discharge protection circuit configured to protect the energy storage from discharging below an over-discharge threshold value.

7. The self-powered ESL of claim 1, wherein the power manager further includes an over-voltage protection circuit configured to protect the load from voltage higher than an over-voltage threshold value.

8. The self-powered ESL of claim 1, wherein the power manager further includes an under-voltage protection circuit configured to protect the load from voltage lower than an under-voltage threshold value.

9. The self-powered ESL of claim 1, wherein the communication circuit is further configured to receive at least one instruction over a network, wherein the at least one instruction, when executed by the processing circuitry, configures the ESL to perform at least one function.

10. The self-powered ESL of claim 9, wherein the at least one function is at least one of: reset the display, refresh the display, restart the ESL, reset the ESL, display at least an image on the display, send information from the ESL to a server, and power down the display.

11. The self-powered ESL of claim 1, wherein the load is implemented as a semiconductor device including a top conductive layer (TCL), wherein the plurality of PV cells is deposited on the load and connected to the TCL.

12. The self-powered ESL of claim 1, wherein the energy storage is at least a super capacitor.

13. The self-powered ESL of claim 1, wherein the display is an ultra-low power display.

14. The self-powered ESL of claim 1, wherein the load is coupled to at least the power manager.

15. The self-powered ESL of claim 14, wherein the load includes at least one of: the processing circuitry, a memory, the display, and the communication circuit.

16. The self-powered ESL of claim 1, wherein the processing circuitry configures a change in the display, in response to the communication circuit detecting a user device.

17. The self-powered ESL of claim 16, wherein the user device is at least one of: a smartphone, a smartwatch, a dedicated terminal, or a radio-frequency identification (RFID) tag.

18. The self-powered ESL of claim 1, wherein the plurality of PV cells provides a current reading to the processing element as a photo-sensing circuit.

19. The self-powered ESL of claim 1, wherein the power manager further includes a secondary processing circuitry for configuring the power manager.

20. The self-powered ESL of claim 1, wherein the processing circuitry controls the power manager.

* * * * *